United States Patent
Venkataraman et al.

(10) Patent No.: US 10,922,164 B2
(45) Date of Patent: Feb. 16, 2021

(54) FAULT ANALYSIS AND PREDICTION USING EMPIRICAL ARCHITECTURE ANALYTICS

(71) Applicant: Accenture Global Solutions Limited, Dublin (IE)

(72) Inventors: Mahesh Venkataraman, Bangalore (IN); Jothi Gouthaman, Chennai (IN); Sunder Ranganathan Nochilur, Bangalore (IN); Radhika Golden, Trivandrum (IN)

(73) Assignee: Accenture Global Solutions Limited, Dublin (IE)

( * ) Notice: Subject to any disclaimer, the term of this patent is extended or adjusted under 35 U.S.C. 154(b) by 114 days.

(21) Appl. No.: 16/399,265

(22) Filed: Apr. 30, 2019

(65) Prior Publication Data
US 2020/0348995 A1    Nov. 5, 2020

(51) Int. Cl.
| G06F 11/00 | (2006.01) |
| G06F 11/07 | (2006.01) |
| G06F 11/34 | (2006.01) |

(52) U.S. Cl.
CPC ........ *G06F 11/079* (2013.01); *G06F 11/0751* (2013.01); *G06F 11/0793* (2013.01); *G06F 11/3409* (2013.01); *G06F 11/3476* (2013.01)

(58) Field of Classification Search
CPC .............. G06F 11/079; G06F 11/3409; G06F 11/0751; G06F 11/3466; G06F 11/0769;
(Continued)

(56) References Cited

U.S. PATENT DOCUMENTS

| 8,676,432 B2 * | 3/2014 | Patnaik ............... G06F 16/2474 |
| | | 701/29.1 |
| 2009/0113248 A1 | 4/2009 | Bock et al. |

(Continued)

FOREIGN PATENT DOCUMENTS

| EP | 3734520 A1 | 11/2020 |
| WO | 2008/060015 A1 | 5/2008 |

OTHER PUBLICATIONS

Extended European Search Report dated Apr. 5, 2020 for European Patent Application No. 20167580.8.
(Continued)

*Primary Examiner* — Charles Ehne
(74) *Attorney, Agent, or Firm* — Plumsea Law Group, LLC

(57) ABSTRACT

A method and system for fault analysis and prediction in an enterprise environment is described. In one embodiment, a method includes obtaining data from a plurality of sources in the enterprise environment. The plurality of sources includes at least one or more systems, users, or applications. The obtained data is associated with identifiers that include a theme selected from a set of themes and one or more keywords that are specific to each theme. The method includes generating a workflow for a user based on a session identifier and/or timestamps associated with activity by the user. The workflow identifies a time-based sequence of interactions by the user with the at least one or more systems or applications in the enterprise environment. The method also includes determining at least one fault identification or fault prediction based on the workflow and identifiers associated with the obtained data that corresponds to the workflow.

20 Claims, 7 Drawing Sheets

(58) Field of Classification Search
CPC . G06F 11/3476; G06F 11/0781; G06F 11/327
See application file for complete search history.

(56) References Cited

U.S. PATENT DOCUMENTS

| | | | |
|---|---|---|---|
| 2009/0234908 A1* | 9/2009 | Reyhner | G06F 9/546 709/203 |
| 2013/0155834 A1* | 6/2013 | Yingling, Jr. | G06Q 30/016 370/216 |
| 2014/0208169 A1 | 7/2014 | Randhir et al. | |
| 2017/0249234 A1* | 8/2017 | Kalech | G06F 11/3604 |
| 2018/0174067 A1* | 6/2018 | Spiro | G06K 9/00 |

OTHER PUBLICATIONS

Response to EP Communication pursuant to Rules 70(2) and 70a(2) EPC and references to Rule 39(1) EPC as filed Nov. 26, 2020.

* cited by examiner

FAULT ANALYSIS AND PREDICTION USING EMPIRICAL ARCHITECTURE ANALYTICS

TECHNICAL FIELD

The present disclosure relates to data analytics. More specifically, the present disclosure generally relates to a method and system for fault analysis and prediction using empirical architecture analytics.

BACKGROUND

With modern software applications and systems evolving to become more sophisticated (i.e., more complex, dynamic, robust and distributed in nature), enterprises are grappling with the technical challenge of ensuring reliability and availability. Customers not only want business applications to constantly evolve to rapid changing requirements but also expect high availability and high-performance applications. If customer experiences are not sufficiently fast and reliable, the result can be a lost opportunity for a business, such as a loss in revenue or a negative brand experience.

Despite significant investments in agile engineering and automation practices, production systems continue to see critical failures. The majority of these production failures are due to causal sequences under specific usage conditions that are not easy to envisage during design and testing. Additionally, many critical production failures are not reproducible in an engineering environment.

SUMMARY

Over 80% of critical production failures are due to extra-functional root causes like scalability, reliability, stability, performance, fault recovery, exception handling etc. These non-functional attributes are related to architecture quality (i.e., technical design of the architecture components, interfaces and parameters). Accordingly, many critical production failures are due to architecture quality, which can degrade due to many reasons.

For example, developers and architects are not equipped to predict the runtime consequences of design and architecture choices for a particular environment. Systems can undergo critical failures under specific conditions that cannot be foreseen reliably. These design and architectural choices can cause architectural degradation in the context of specific usage conditions. Because testers do not have view of actual system usage patterns in the real world, how systems respond under those usage conditions, and the associated failure modes, test inputs do not adequately address these interactions between different systems and applications under real-world usage conditions. In addition, certain interactions between applications and/or systems initiated by a user in the environment may cause a fault or failure that may not be reproducible without knowledge of the sequence of events or workflow by the user that caused the fault or failure.

The techniques of the example embodiments described herein provide a method and system for fault analysis and prediction that uses empirical architecture analytics of an enterprise environment. These techniques provide a solution that identifies parameters that are indicative of architecture quality, employs empirical analytics of these parameters under various conditions of system usage, derives meaningful inferences about system usage and behavior under those usage conditions, and provides fault diagnosis, anomaly detection, and identification of silent failures.

The information and solutions provided by the example embodiments may be used to make architecture and design choices, remediate architecture as required, diagnose and predict failures, and design test inputs and conditions to reflect usage, anomalies and failures within the specifics of a given enterprise environment.

In one aspect, a method for fault analysis and prediction in an enterprise environment is provided, the method comprising: obtaining data from a plurality of sources in the enterprise environment, wherein the plurality of sources includes at least one or more systems, users, or applications; associating the obtained data with identifiers that include a theme selected from a set of themes and one or more keywords, wherein the keywords are specific to each theme; generating a workflow for a user based on a session identifier and/or timestamps associated with activity by the user, wherein the workflow identifies a time-based sequence of interactions by the user with the at least one or more systems or applications in the enterprise environment; and determining at least one fault identification or fault prediction associated with the enterprise environment based on the workflow and identifiers associated with the obtained data that corresponds to the workflow.

In another aspect, a system for fault analysis and prediction in an enterprise environment is provided, the system comprising: at least one interface configured to communicate with systems and applications in the enterprise environment; a memory; and a processor in communication with the at least one interface and the memory, wherein the processor is configured to: obtain data from a plurality of sources in the enterprise environment, wherein the plurality of sources includes at least one or more systems, users, or applications; associate the obtained data with identifiers that include a theme selected from a set of themes and one or more keywords, wherein the keywords are specific to each theme; generate a workflow for a user based on a session identifier and/or timestamps associated with activity by the user, wherein the workflow identifies a time-based sequence of interactions by the user with the at least one or more systems or applications in the enterprise environment; and determine at least one fault identification or fault prediction associated with the enterprise environment based on the workflow and identifiers associated with the obtained data that corresponds to the workflow.

In another aspect, one or more non-transitory computer readable storage media encoded with instructions are provided that, when executed by a processor of a fault analysis and prediction system, causes the processor to: obtain data from a plurality of sources in an enterprise environment, wherein the plurality of sources includes at least one or more systems, users, or applications; associate the obtained data with identifiers that include a theme selected from a set of themes and one or more keywords, wherein the keywords are specific to each theme; generate a workflow for a user based on a session identifier and/or timestamps associated with activity by the user, wherein the workflow identifies a time-based sequence of interactions by the user with the at least one or more systems or applications in the enterprise environment; and determine at least one fault identification or fault prediction associated with the enterprise environment based on the workflow and identifiers associated with the obtained data that corresponds to the workflow.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
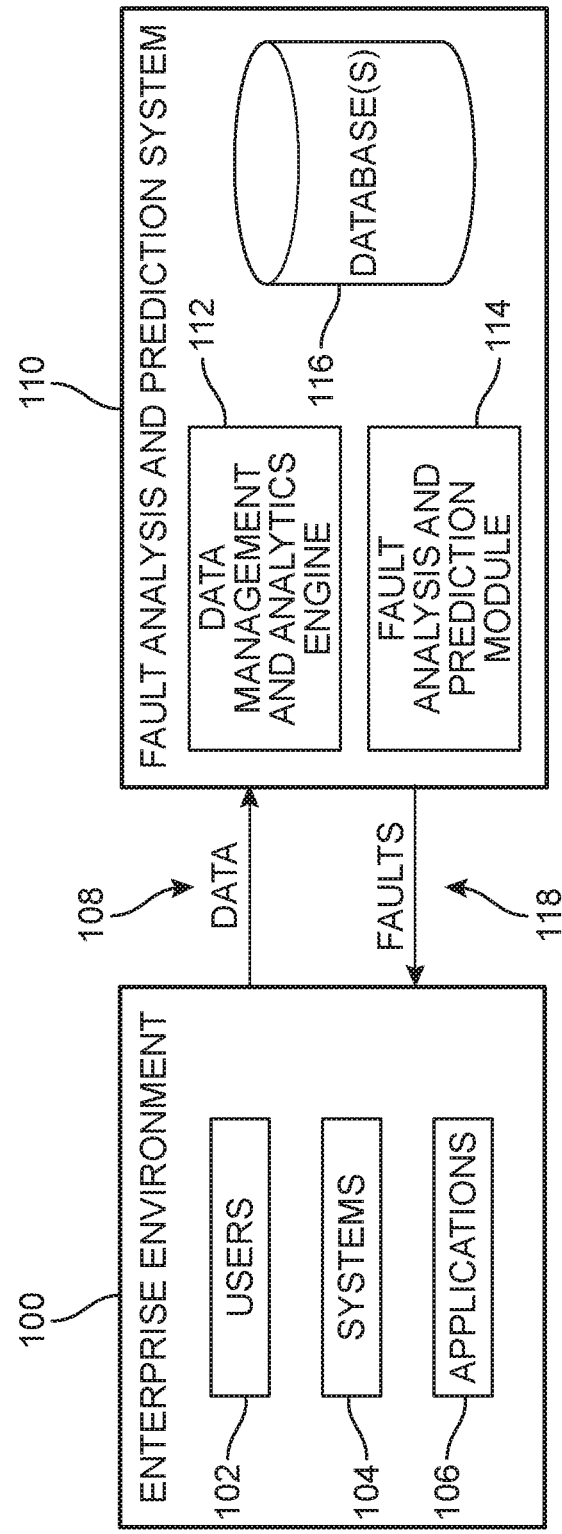
FIG. 1 is a schematic diagram of an example embodiment of an enterprise environment interacting with a fault analysis and prediction system.

The present embodiments provide a system and method for fault analysis and prediction that uses empirical architecture analytics of an enterprise environment. Referring now to FIG. 1, an enterprise environment 100 is shown interacting with an example embodiment of a fault analysis and prediction system 110. In some embodiments, fault analysis and prediction system 110 is configured to identify parameters associated with enterprise environment 100 that are indicative of architecture quality, perform empirical analysis of those parameters under various usage conditions, derive inferences about the usage and behavior of enterprise environment 100 under the various usage conditions, and provide one or more of fault diagnosis, fault prediction, anomaly detection, and/or identification of silent failures.

In addition, in some embodiments, fault analysis and prediction system 110 may further use the information obtained about enterprise environment 100 to make or recommend architecture and design choices, remediate existing system architecture, diagnose and/or prognose failures, and/or design test inputs and conditions that reflect the usage of enterprise environment 100, including any anomalies or failures.

As shown in FIG. 1, enterprise environment 100 may include a plurality of users 102, a plurality of systems 104, and a plurality of applications 106. For example, enterprise environment 100 may be a business, an organization, a governmental or regulatory body, a utility, a service provider, or any other entity or entities. Plurality of users 102 include various people and personnel that have access to and/or interact with enterprise environment 100. In some embodiments, each user of plurality of users 102 may have an associated user account or other identifier (e.g. user ID) that allows the user to be uniquely determined or distinguished from other users of enterprise environment 100.

Plurality of systems 104 include various hardware components and architecture associated with enterprise environment 100. For example, plurality of systems 104 may include one or more computer networks, servers, databases, devices, administration or business infrastructure, or other hardware or subsystems within enterprise environment 100 with which a user of plurality of users 102 may interact. Plurality of applications 106 include one or more applications, programs, scripts, routines, or other software-implemented mechanisms or modules that are configured to be executed on a system of plurality of systems 104. In an example embodiment, one or more users of plurality of users 102 may interact with or implement an application of plurality of applications 106 within enterprise environment 100. In some embodiments, plurality of applications 106 may also include one or more applications that interact with an administrator, other applications, and/or operate automatically within enterprise environment 100 without directly interacting with a user of plurality of users 102.

In an example embodiment, data 108 associated with one or more users of plurality of users 102, one or more systems of plurality of systems 104, and/or one or more applications of plurality of applications 106 may be collected and provided to fault analysis and prediction system 110 from enterprise environment 100. For example, as will be detailed further below, data collection agents may be used to collect, gather, and/or extract data 108 from the various components of enterprise environment 100, including, but not limited to, plurality of users 102, plurality of systems 104, and/or plurality of applications 106. Additionally, data 108 provided to fault analysis and prediction system 110 may include other information associated with enterprise environment 100 that may be used by fault analysis and prediction system 110 for fault analysis and prediction.

In an example embodiment, fault analysis and prediction system 110 includes one or more processors and/or circuitry configured to implement at least a data management and analytics engine 112 and a fault analysis and prediction module 114. For example, data management and analytics engine 112 may be configured to receive data 108 associated with enterprise environment 100 and perform one or more operations to classify, sort, group, clean, and/or organize the data for further processing or analysis by fault analysis and prediction system 110. Fault analysis and prediction module 114 may be configured to use the classified, sorted, grouped, cleaned, and/or organized data from data management and analytics engine 112 for fault analysis and/or prediction about potential faults, failures, anomalies, or other issues determined from data 108 associated with enterprise environment 100. For example, fault analysis and prediction module 114 may provide one or more faults 118 to enterprise environment 100. In some embodiments, faults 118 may be used for implementing a corrective action within enterprise environment.

Additionally, in some embodiments, fault analysis and prediction system 110 may include one or more databases 116 used to store various information associated with enterprise environment 100. For example, databases 116 may include databases of identifiers, known faults, workflows, root causes and fixes, or other information that may be used by fault analysis and prediction system 110 for fault analysis and prediction. In some cases, databases 116 may include historical databases associated with other enterprise environments.

Figure 2:
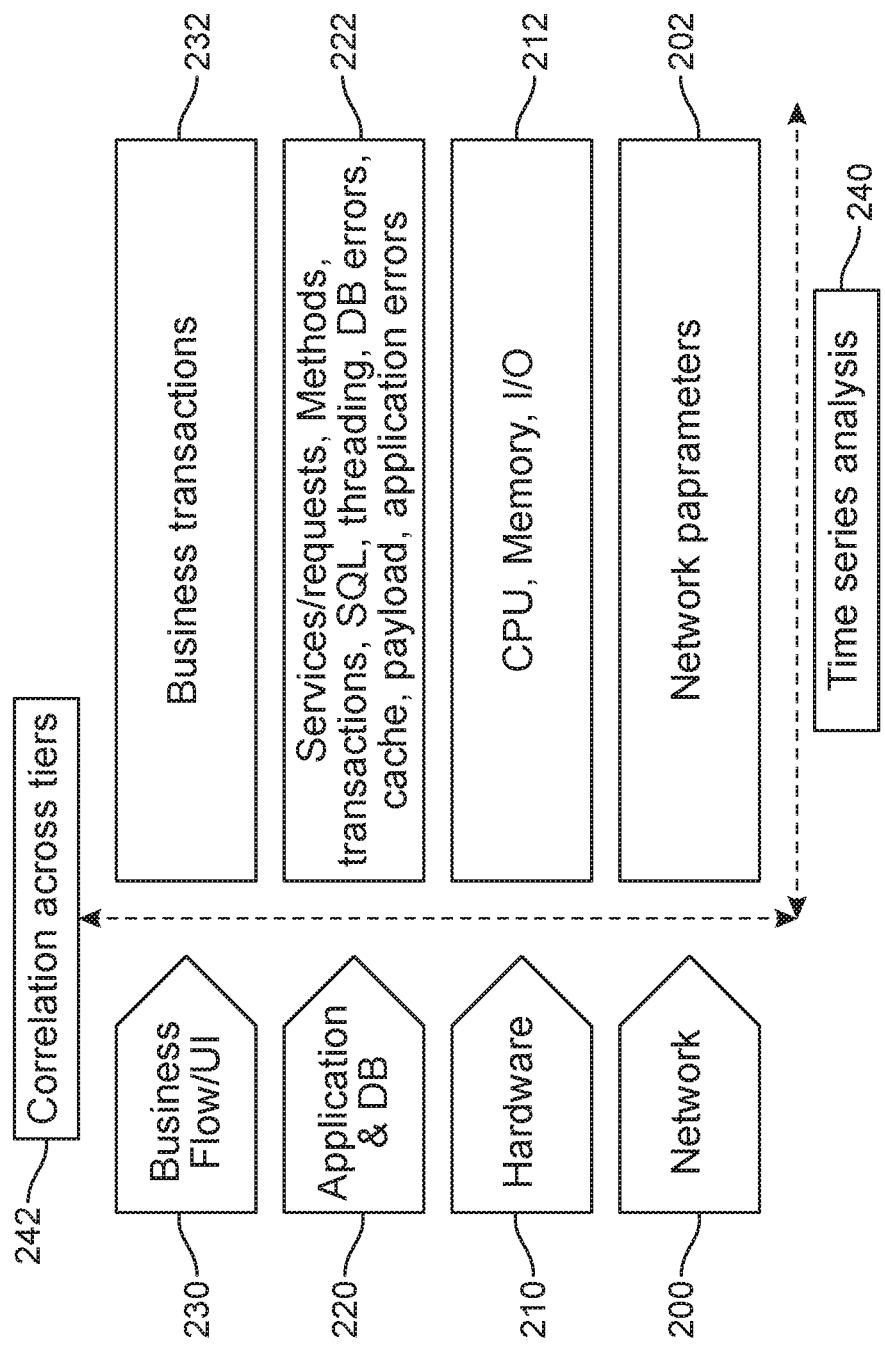
FIG. 2 is a schematic diagram of architecture layers in an enterprise environment.

Referring now to FIG. 2, a diagram of architecture layers in an enterprise environment is illustrated. In different embodiments, the architecture of a given enterprise environment may vary depending on the particular arrangement or type of enterprise. FIG. 2 illustrates an example embodiment of architecture layers in a representative enterprise environment, for example, enterprise environment 100. In this embodiment, enterprise environment 100 includes at least a network layer 200, a hardware layer 210, an application and database (DB) layer 220, and a business flow or user interface (UI) layer 230.

In some embodiments, parameters about enterprise environment 100 across one or more of network layer 200, hardware layer 210, application and database (DB) layer 220, and business flow or user interface (UI) layer 230 are monitored and analyzed by fault analysis and prediction system 110. For example, information associated with various network parameters 202 may be monitored and/or analyzed for network layer 200. Similarly, information associated with hardware parameters 212 may be monitored and/or analyzed for hardware layer 210. For example, hardware parameters 212 may include information about different hardware configurations and devices in enterprise environment 100, including, but not limited to central processing unit (CPU) information (e.g., processing power, speed, utilization, etc.), memory information (e.g., types, amounts, utilization, etc.), and/or input/output (I/O) information (e.g., input and/or output devices, data transfer rates, latency, etc.).

Additionally, information associated with application/DB parameters 222 may be monitored and/or analyzed for application and DB layer 220. For example, application parameters 222 may include information about different applications or DBs in enterprise environment 100, including, but not limited to services and/or requests, methods, transactions, Structured Query Language (SQL), threading, DB errors, cache, payload, application errors, etc. Information associated with various business/UI parameters 232, for example, business transactions, workflow, UI interactions, etc., may also be monitored and/or analyzed for business flow/UI layer 230.

According to the principles of the example embodiments described herein, the parameters obtained from all of the architecture layers of enterprise environment (i.e., parameters 202, 212, 222, 232 from each of layers 200, 210, 220, 230) may be used by fault analysis and prediction system 110. For example, fault analysis and prediction system 110 may evaluate the parameters using a time series analysis 240 (i.e., evaluation of the parameters over time) and/or may correlate the parameters across tiers 242 (i.e., identify and evaluate relationships between the parameters across the various architecture layers).

In an example embodiment, parameters 202, 212, 222, 232 from each of layers 200, 210, 220, 230 may be provided to fault analysis and prediction system 110 as part of data 108, as shown in FIG. 1. In some embodiments, data associated with an enterprise environment (e.g., data 108 associated with enterprise environment 100) may be collected from various sources within the enterprise environment, as well as sources outside of the enterprise environment that interact with users, systems, or applications within the enterprise environment. In an example embodiment, data from a plurality of sources in the enterprise environment may be obtained using a plurality of agents to collect the data.

For example, data may be typically collected from one or more sources, including, but not limited to: server hardware and system health logs (e.g., desktop, mobile, tablets, etc.), user interface logs, web server logs, application service logs, application monitoring trace files, database logs, and any other system capable of generating text-based logs.

Figure 3:
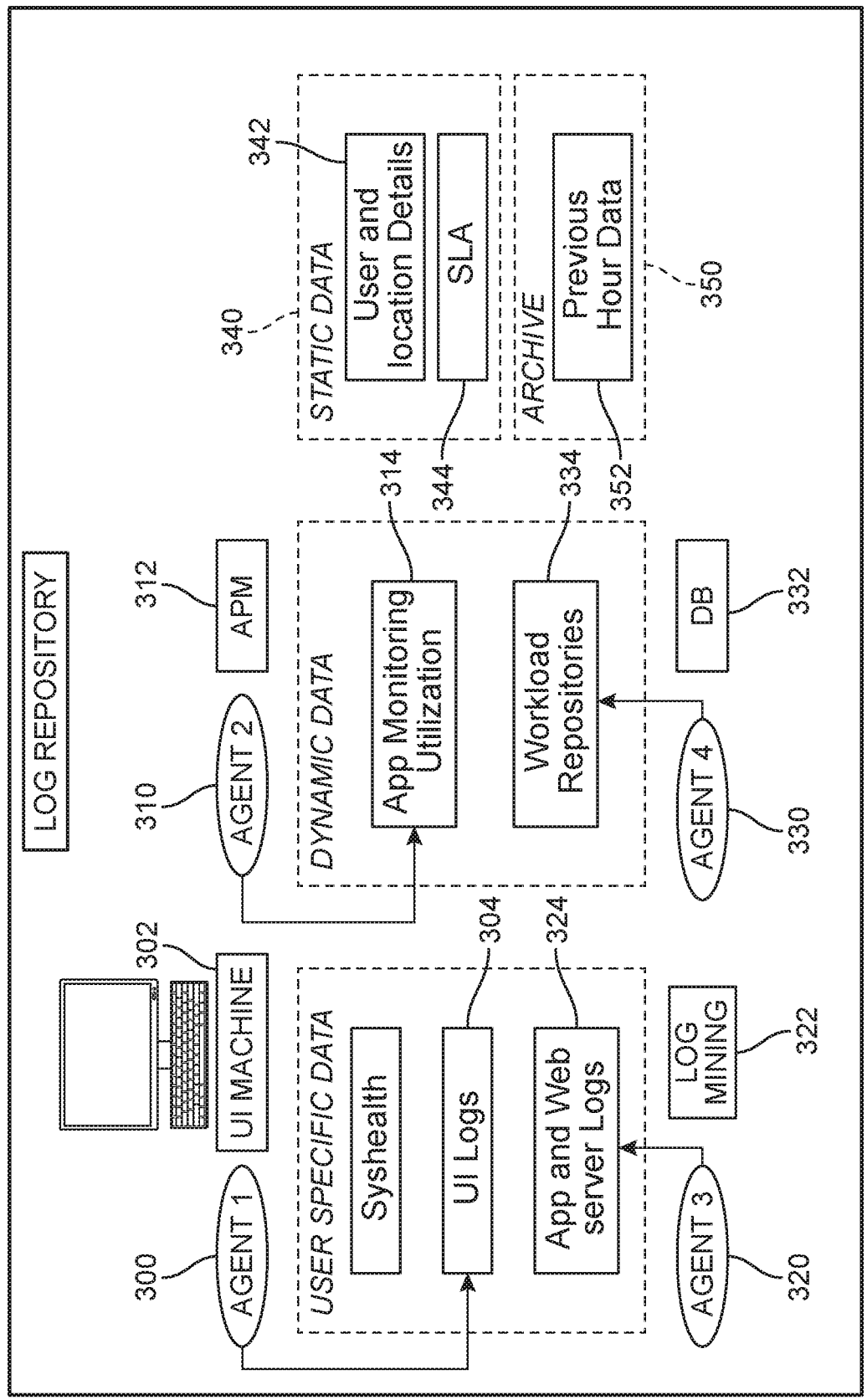
FIG. 3 is a schematic diagram of data collection agents within an enterprise environment.

In some embodiments, each agent of the plurality of agents may collect data from a different source within the enterprise environment. Referring now to FIG. 3, a schematic diagram of data collection agents within enterprise environment 100 is illustrated. In this embodiment, data acquisition from a plurality of sources within enterprise environment is obtained by a plurality of agents, including a first agent 300, a second agent 310, a third agent 320, and a fourth agent 330.

As shown in FIG. 3, first agent 300 is associated with a user device or machine, for example, UI machine 302, and is configured to collect client-side logs associated with user-specific data. In this embodiment, first agent 300 obtains data from enterprise environment 100 associated with various user logs 304 of users of plurality of users 102 in enterprise environment 100 (shown in FIG. 1). First agent 300 may collect or obtain data from different formats of user devices, including, but not limited to desktop computers, mobile computers or phones, tablets, etc. Additionally, first agent 300 may be deployed across multiple devices associated with the same user and/or multiple devices associated with different users with enterprise environment 100.

In this embodiment, second agent 310 is associated with application performance monitoring (APM) tools 312 (e.g., AppDynamics, New Relic, and other APM tools) and is configured to obtain dynamic data associated with trace files. For example, second agent 310 may collect or obtain data associated with application monitoring utilization 314 generated by APM tools 312 deployed within enterprise environment 100 to monitor applications associated with plurality of applications 106 (shown in FIG. 1). Third agent 320 obtains data from log mining 322 various types of application and web server logs 324, including packaged application logs (e.g., SAP, Siebel, etc.), that may interact with enterprise environment 100.

Finally, fourth agent 330 is associated with one or more databases (DB) 332 and is configured to extract log entries from logs generated by databases within enterprise environment 100. For example, fourth agent 330 may collect or obtain data associated with workload repositories 334 within enterprise environment 100. Fourth agent 330 may be configured to be compatible with various types of databases that may be present in an enterprise environment, including databases using relational database management systems (RDBMS), not only SQL (NoSQL) systems, and other database management systems.

In an example embodiment, the plurality of agents 300, 310, 320, 330 are configured to extract log entries and obtain the data at various time intervals based, for example, on the volume of logs being generated. The data associated with enterprise environment 100 obtained from each of first agent 300, second agent 310, third agent 320, and fourth agent 330 may be collected and ingested into fault analysis and prediction system 110. For example, as shown in FIG. 1 above, data 108 may be obtained from plurality of agents 300, 310, 320, 330 and ingested into data management and analytics engine 112 of fault analysis and prediction system 110.

In an example embodiment, the data associated with enterprise environment 100 that is collected by the plurality of agents 300, 310, 320, 330 includes real-time data. In other embodiments, additional data associated with enterprise environment 100 may be obtained from other sources, including, but not limited to static data 340, such as user and location details 342 and/or service level agreement (SLA) data 344, and archival data 350 associated with previous time periods, such as previous hour data 352.

While four agents have been shown in the example embodiment illustrated in reference to FIG. 3, it should be understood that an enterprise environment may have any number of different data collection agents. For example, the number and/or type of data collection agents may be specific to the architecture of a given enterprise environment.

Figure 4:
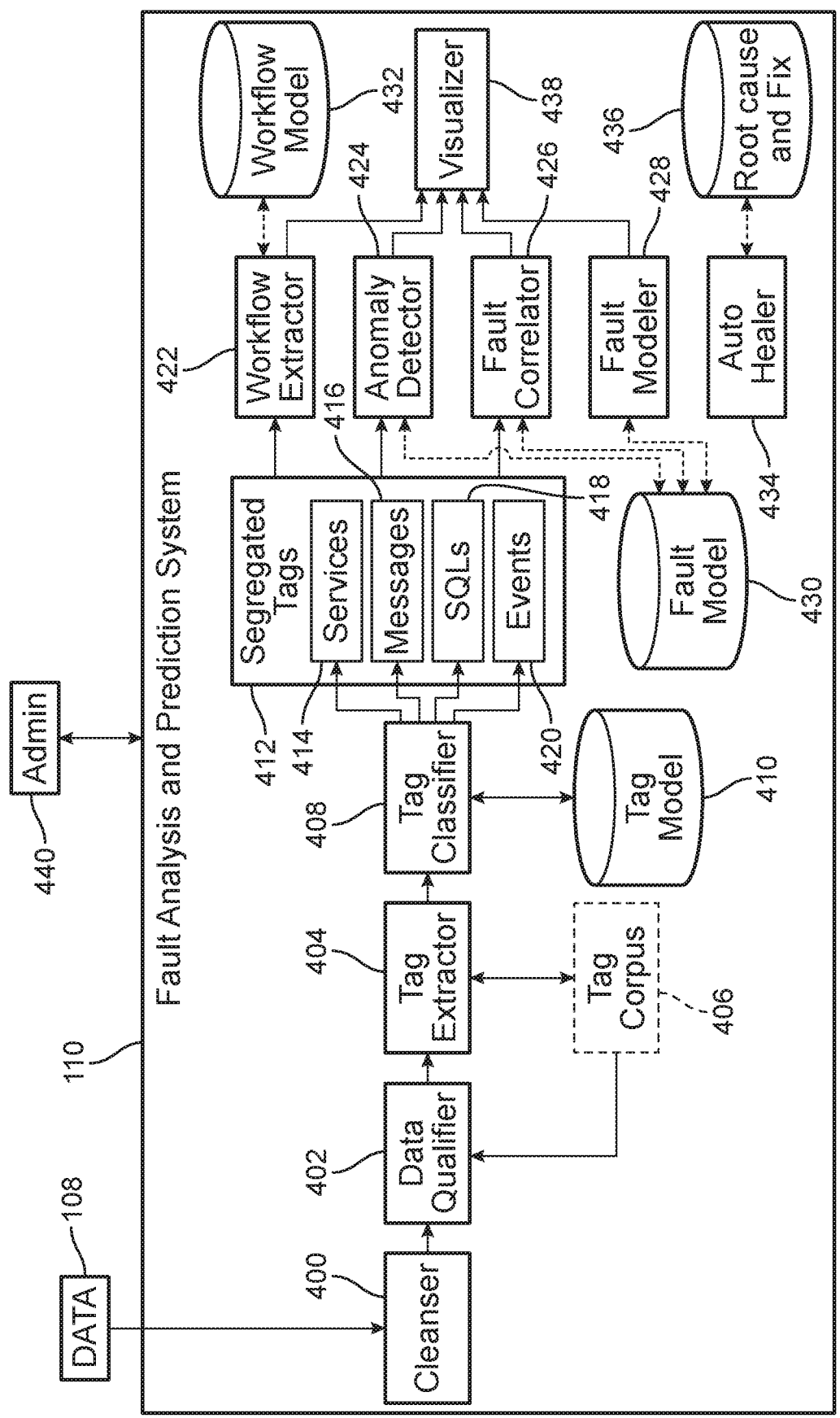
FIG. 4 is a schematic diagram of an example embodiment of a fault analysis and prediction system.

FIG. 4 is a schematic diagram of an example embodiment of fault analysis and prediction system 110. In this embodiment, components of fault analysis and prediction system 110, including data management and analytics engine 112 and fault analysis and prediction module 114, are shown in detail. The components of fault analysis and prediction system 110 described herein may be embodied in hardware, software, or a combination of both.

As shown in FIG. 4, in one embodiment, data 108 from enterprise environment 100 is received at a cleanser module 400. Data ingested by the various data collection agents (e.g., plurality of agents 300, 310, 320, 330) may be in different formats. Additionally, some logs may have special characters that may not be subject to analysis or have meaning outside of their function within the logs. In an example embodiment, cleanser module 400 is configured to clean or refine data 108 from enterprise environment 100 for use by fault analysis and prediction system 110.

For example, in some embodiments, cleanser module 400 may perform one or more of the following actions, including, but not limited to: formatting the data to a compatible format, removing special characters in the data that may cause complications with analysis, removing duplicate files and/or log entries that are generated due to synchronization limitations or other duplicate processes, as well as other operations to organize or arrange the data from the enterprise environment (e.g., enterprise environment 100).

In an example embodiment, the cleansed data (e.g., data 108) after passing through cleanser module 400 may be passed to a data qualifier module 402. In this embodiment, data qualifier module 402 takes the cleansed data as an input and performs one or more actions to provide contextual or other information to the data. For example, in some embodiments, data qualifier module 402 may perform one or more of the following actions, including, but not limited to: segregating log files into types (e.g., device, web server, app server, database, trace, and/or application monitoring), determining the specific software that generated a log file (e.g., classify a web server log as being generated by Apache Tomcat or Microsoft IIS), sequencing the logs according to timestamps associated with the data, merging files and/or eliminating redundant entries that are generated as part of merging various files, as well as other operations to associate information about the source and/or generation of the data with the data from the enterprise environment (e.g., enterprise environment 100).

Fault analysis and prediction system 110 may also include a tag extractor module 404. In an example embodiment, tag extractor module 404 may associate one or more tags or identifiers with the obtained data from enterprise environment (e.g., data 108 ingested from enterprise environment 100). In some embodiments, tag extractor module 404 may access or use a tag corpus 406 to extract and/or associate identifiers with the obtained data.

Tag corpus 406 may include a predetermined database or list of identifiers or tags, including, but not limited to sets of industry, technology, organization, and/or application specific identifiers or tags. Additionally, if the data obtained from the enterprise environment includes identified identifiers or tags that are not already present in tag corpus 406, then tag extractor module 404 may recommend the new identifiers or tags for inclusion in tag corpus 406.

In an example embodiment, tag extractor module 404 may extract statistics regarding all the identifiers or tags and the correlations among the identifiers or tags. Tag extractor module 404 is configured to process the text from each file in the obtained data to extract identifiers or tags at two levels: themes and keywords. For example, identifiers used by tag extractor module 404 include a theme selected from a set of themes and one or more keywords that are specific to each theme. These themes and keywords may be associated with the data as identifiers.

Figure 5:
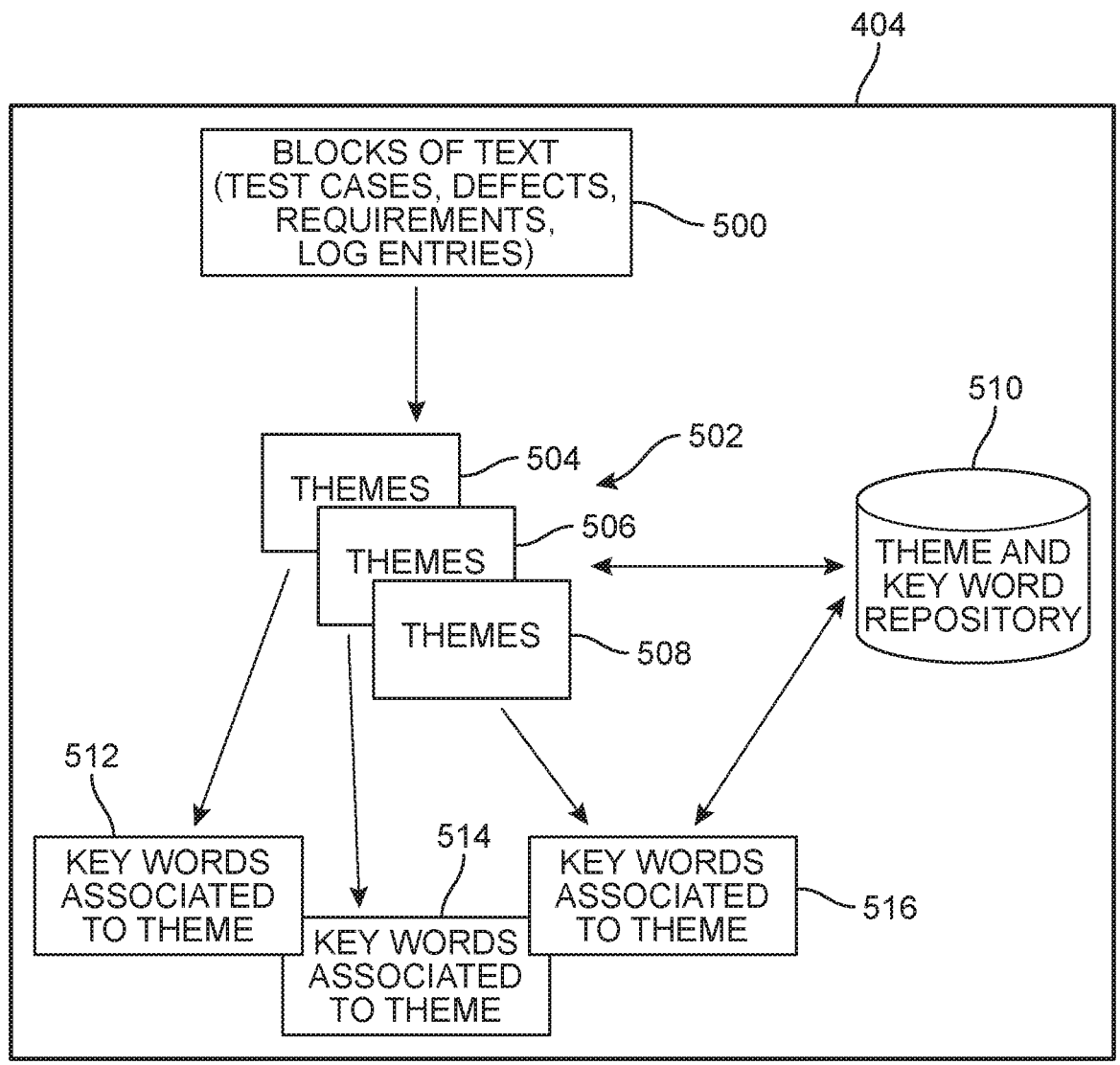
FIG. 5 is a representative diagram of associating themes and keywords to collected data.

Referring now to FIG. 5, a process of associating themes and keywords with collected data (e.g., data 108 from enterprise environment 100) by tag extractor module 404 is shown. In this embodiment, tag extractor module 404 receives blocks of text 500, which may be generated from data 108 obtained from enterprise environment 100 and which may have passed through cleanser module 400 and/or data qualifier module 402. Blocks of text 500 may include test cases, defects, requirements, log entries, etc. In an example embodiment, tag extractor module 404 assigns a theme to each line or block of text in block of text 500. As shown in FIG. 5, a theme may be selected from a set of themes 502 relating to different actions, processes, scenarios, or other functions or capabilities within enterprise environment 100. In this embodiment, set of themes 502 includes a first theme 504, a second theme 506, and a third theme 508. For example, a theme may be a business process (e.g., new employee onboarding), a subject area (e.g., employee), and/or a scenario (e.g., creating a new account).

Keywords associated with each theme of set of themes 502 are identified and extracted. In an example embodiment, keywords are specific to each theme. For example, as shown in FIG. 5, a first group of keywords 512 are specific to first theme 504, a second group of keywords 514 are specific to second theme 506, and a third group of keywords 516 are specific to third theme 508. Theme to keyword association may be identified based on previous learnings. In addition, even if an exact keyword associated with a theme does not appear in a block of text from blocks of text 500, associated keywords may be used for identifying a theme.

For example, if the following block of text is analyzed: "A Religious Worker's data should be processed like a normal Employee", although the keywords "payroll" or "salary" do not appear in this sample block of text, tag extractor module 404 associates "Religious Worker" with "salary" and maps this block of text to the "payroll" theme.

In an example embodiment, tag extractor module 404 performs the following operations. First, tag extractor module 404 extracts themes (e.g., themes 504, 506, 508 from set of themes 502) from the ingested data (e.g., data 108) using a theme and keyword repository 510 as a lookup database. Next, tag extractor module 404 extracts keywords from the ingested data using theme and keyword repository 510 to find one or more keywords that are specific to each theme (e.g., themes 504, 506, 508 from set of themes 502). In this embodiment, themes and keywords are not extracted based on text similarity but based on context similarity. Theme and keyword repository 510 may be specific to the industry, enterprise, applications, and/or systems associated with the enterprise environment (e.g., applications 104 and/or systems 106 associated with enterprise environment 100).

Additionally, any new identifiers (e.g., themes and/or associated keywords for a theme) which are not already present in tag corpus 406 and/or theme and keyword repository 510 may be identified by tag extractor module 404. An administrator 440 of fault analysis and prediction system 110 or a subject matter expert (SME) can evaluate these new identifiers (e.g., themes and/or associated keywords) for addition to tag corpus 406 and/or theme and keyword repository 510. For example, as shown in FIG. 5, third group of keywords 516 that are specific to third theme 508 may be added to theme and keyword repository 510.

Referring back to FIG. 4, fault analysis and prediction system 110 includes a tag classifier module 408. In an example embodiment, tag classifier module 408 segregates or classifies the extracted identifiers or tags from tag extractor module 404 into various predefined groups, which may be stored in a tag model repository 410. Examples of predefined groups in tag model repository 410 include, but are not limited to: Business Processes, Objects, Actors, Actions, Expected Results, Validations, Exceptions, Services and APIs, Input Parameters, Return Parameters, Methods, Exceptions, Messages, SQLs, Device Events (e.g., service start, stop, or restart), Device Attributes (e.g., CPU usage, Memory usage, Number of Threads, etc.), as well as other predefined groups which may be specific to the industry, enterprise, applications, and/or systems associated with the enterprise environment.

Classification by tag classifier module 408 may be performed based on the words appearing in a sentence or block of text. Proximity of the words in the block of text being analyzed is compared with the proximity of similar set of words in other blocks of text. For example, consider two blocks of text, A and B, where Block A recites "Salary for the month of January should be credited for all Employees" and Block B recites "Salary for the month of January should be credited for all Religious Workers".

In this example, tag classifier module 408 identifies that "Religious Worker" is used in the same context as "Employee". Accordingly, tag classifier module 408 treats these words as one group of words and uses this learning for classification purposes. Tag classifier module 408 accesses the database in tag model repository 410 for groups and associated identifiers or tags (e.g., themes and/or associated keywords) for appropriately classifying the identifiers in the obtained data from the enterprise environment (e.g., data 108 from enterprise environment 100).

In this embodiment, tag classifier module 408 outputs one or more groups of segregated or classified tags 412, including a first group 414 associated with Services, a second group 416 associated with Messages, a third group 418 associated with SQLs, and a fourth group 420 associated with Events. Additionally, groups 414, 416, 418, 420 of classified tags 412 may be reviewed and/or reclassified through a manual process, such as by administrator 440 or SME. These manual changes may then be updated in tag model repository 410.

Fault analysis and prediction system 110 includes a workflow extractor module 422. In some embodiments, a workflow for a user in the enterprise environment is based on a session identifier and/or timestamps associated with the user's activity. The workflow identifies a time-based sequence of interactions by the user with the at least one or more systems or applications in the enterprise environment (e.g., interactions by a user of plurality of users 102 with one or more of plurality of systems 104 and/or plurality of applications 106 of enterprise environment 100, shown in FIG. 1).

In this embodiment, workflow extractor module 422 reconstructs application logs and/or trace file sequences based on the one or more groups of segregated or classified tags 412, including groups 414, 416, 418, 420, from tag classifier module 408. For example, workflow extractor module 422 may analyze a device log file, a web server log, and an app server log and trace files from an app server. Workflow extractor module 422 may first build a workflow for a user by extracting screen navigation information for the user based on timestamp information to identify a time-based sequence of interactions by the user with systems 104 and/or applications 106 of enterprise environment 100.

For a given time interval under consideration, workflow extractor module 422 may analyze the web server logs and the activities therein may be mapped to the specific user, for example, by matching a session identifier associated with the user or a unique user identifier (user ID or login information). For the same time interval, workflow extractor module 422 may also extract the services, APIs, packages, methods, and/or call information from the app server. From the trace files, server parameters, such as CPU usage, memory usage, threads, heap dump, number of threads, etc., are also analyzed by workflow extractor module 422. Any errors, warnings, or information entries in any of the logs for that time interval are also extracted by workflow extractor module 422.

Based on the information extracted from the various data sources (e.g., logs and traces), workflow extractor module 422 may generate a workflow for a user and associated information. For example, workflow extractor module 422 may generate an end-to-end workflow for a user and the number of times these workflows were used by all users in the enterprise environment (e.g., plurality of users 102 in enterprise environment 100). For example, a database of historical or model workflows associated with the enterprise environment may be stored in a workflow model repository 432. Workflow extractor module 422 may use workflow model repository 432 to compare workflows of multiple users in the enterprise environment.

Workflow extractor module 422 may also generate a usage pattern associated with applications and/or systems in the enterprise environment (e.g., systems 104 and/or applications 106 of enterprise environment 100). The usage pattern may indicate geographies from which users are accessing a particular application or system and the frequency of interaction, including what day of the week and time of day is the usage high, medium, and low. Workflow extractor module 422 may also generate information associated with error and warning patterns, including, for example, are all users facing errors or are specific users getting errors, and are errors occurring in specific applications, systems, methods or services.

Figure 6:
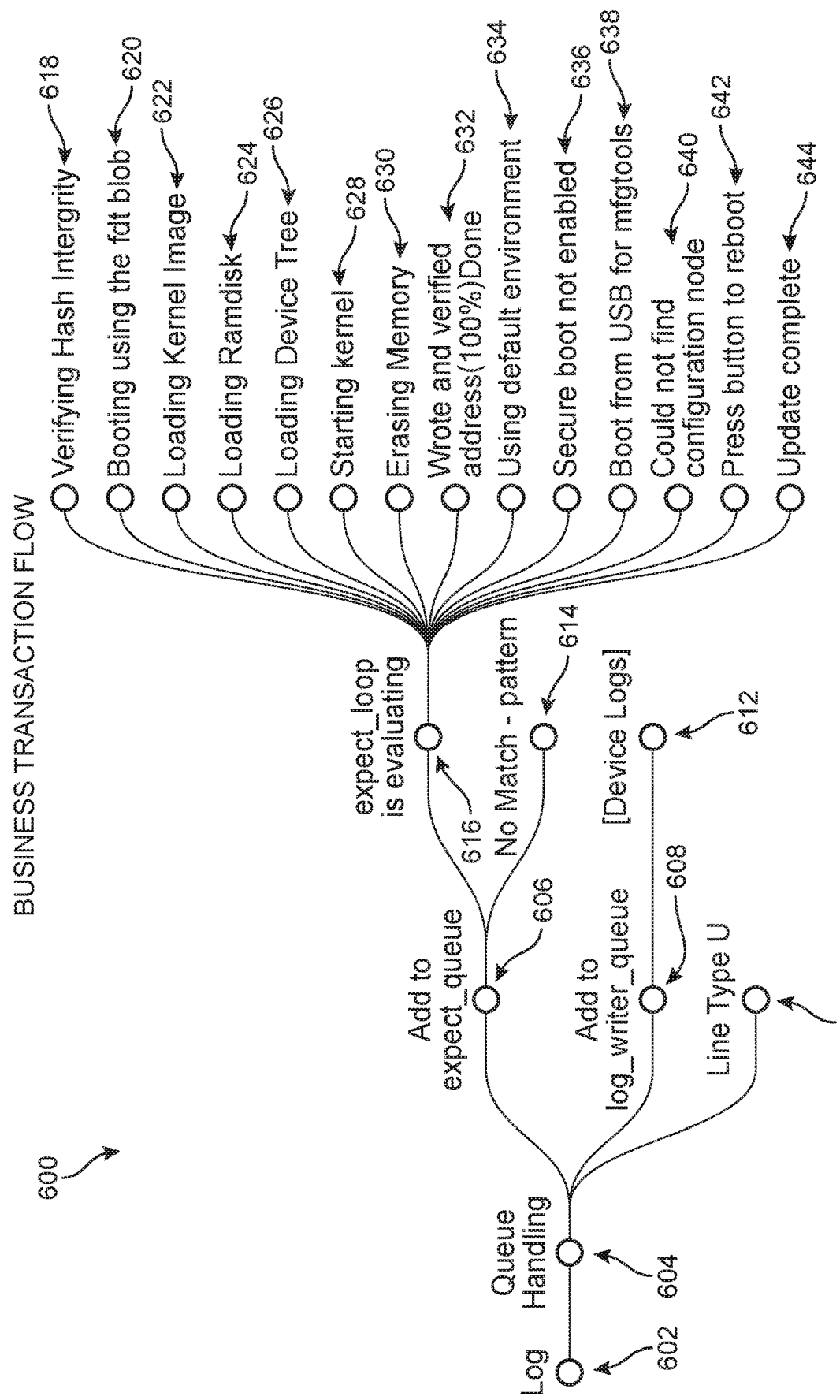
FIG. 6 is a representative diagram of an example embodiment of a workflow for a user in an enterprise environment.

An example of a workflow 600 for a user generated by workflow extractor module 422 is shown in FIG. 6. Workflow 600 is a time-based sequence of interactions by a user within the enterprise environment. In this embodiment, workflow 600 begins with a first interaction 602 (Log). Next, a second interaction 604 (queue handling) leads to three actions, including a third interaction 606 (Add to expect_queue), a fourth interaction 608 (add to log-writer-queue), and a fifth interaction 610 (line type U). After fourth interaction 608, a sixth interaction 612 (device logs) follows. Referring back to third interaction 606, a seventh interaction 614 (no match—pattern) and an eighth interaction 616 (expect_loop is evaluating) follow.

The remaining interactions associated with workflow 600 follow eighth interaction 616. These interactions include: verifying hash integrity 618, booting using the fdt blob 620, loading kernel image 622, loading ramdisk 624, loading device tree 626, starting kernel 628, erasing memory 630, writing and verifying address 100% done 632, using default environment 634, secure boot not enabled 636, boot from USB for mfgtools 638, could not find configuration node 640, press button to reboot 642, and update complete 644. It should be understood that workflow 600 is exemplary and illustrates an example of a workflow for a user that may be generated by workflow extractor module 422.

In general, the sequence of steps performed by workflow extractor module 422 for building or generating a workflow (e.g., workflow 600) are as follows below. First, workflow extractor module 422 establishes correlation across requirements, test cases, defects, log files and/or trace files. This may be accomplished by using identifier (ID) columns for each type of data. If traceability is maintained, for example, in a requirement to test case, then traceability is given first priority. Correlation is also established by mapping themes and associated keywords for the data.

Next, workflow extractor module 422 determines the sequence of interactions by the user based on following techniques in the given order A session or transaction ID associated with the user is used to correlate interactions performed across technology layers. For example, if a workflow scenario begins with a web browser, then goes to SAP, and finally into a database then, the Session ID of the web app server is mapped to the session ID of the SAP server which in turn is mapped to the session ID of the database. When it is not possible to map a session or transaction IDs directly, then a timestamp associated with the user may be used to establish the relationship across technology layers. Additionally, occurrence of contextual similar identifiers or tags (e.g., themes and associated keywords) may be used by workflow extractor module 422 to establish correlations between the data.

A workflow generated for a user by workflow extractor module 422 may then be compared against a database of known workflows from other users in the enterprise environment stored in workflow model repository 432. Workflow extractor module 422 may access the stored workflows in workflow model repository 432 to check the generated workflow for any gaps, deviations, or anomalies based on the comparison. Additionally, if the generated workflow is a new workflow, workflow extractor module 422 may add it to workflow model repository 432 after analysis and/or confirmation by administrator 440 or SME.

Referring back to FIG. 4, fault analysis and prediction system 110 includes an anomaly detector module 424. Anomaly detector module 424 is configured to analyze the one or more groups of segregated or classified tags 412, including groups 414, 416, 418, 420, from tag classifier module 408 and identify correlations between the various types of identifiers or tags. Anomaly detector module 424 is also configured to identify commonly occurring correlations between the data and any outliers or anomalies in the data.

Anomaly detector module 424 may identify technical anomalies and/or functional anomalies. First, consider the following example of a technical anomaly. While testing a web application, testers get a "Unable to find Product Information" message 75% of the time for a specific category of product although product information for this category exists in a product database. If the testers retry the same transaction after some time interval, the subsequent transaction is successful (i.e., product information is returned). Upon analyzing the web application server log file, anomaly detector module 424 observes that this particular transaction sends a request to a message server to get the product information. For most of the attempted transactions, the web application does not get a response from the message server within a predetermined wait time.

Upon analyzing the message server log file for the same time interval, anomaly detector module 424 determines that the message server is receiving more requests than it can process, and, therefore, the message server's performance is slower than normal (i.e., outside of the predetermined wait time) and the "Unable to find Product Information" message is returned to the web application. The recommended solution or fix for this anomaly is to increase the predetermined wait time on the web application server for receiving a response to a request from the message server and/or to increase the number of requests that the message server can handle (e.g., through software configuration or through a hardware upgrade).

According to the techniques of the example embodiments, anomaly detector module 424 analyzes the output of Workflow extractor module 422 and identifies this particular anomaly. In some embodiments, anomaly detector module 424 may send an email or other alert to administrator 440 or other tester with the specific lines of text extracted from the web application server log and the message server log that are associated with the generated anomaly.

Next, consider an example of a functional anomaly. For a trading application, code change data and application usage log files are analyzed by anomaly detector module 424. Anomaly detector module 424 determines that 95% of the code change data is associated with trade in Asia. However, 99% of application usage is with respect to trade transactions involving Europe. Anomaly detector module 424 determines that the trading application enhancements (e.g., code changes), and, therefore, information technology budget, is being performed on an area of the application which is seldom used.

Additionally, consider an example of a usage anomaly. Anomaly detector module 424 analyzes a web server log and new infrastructure requests (e.g., through service tickets). Anomaly detector module 424 determines that all new infrastructure is requested to be hosted in London, but there is an 80% increase in usage of the web server from China. Accordingly, anomaly detector module 424 determines that the new infrastructure, for example, a new server, should be provisioned in China instead of London.

In some embodiments, fault analysis and prediction system 110 may also include a fault correlator module 426. Fault correlator module 426 is configured to maps or correlate errors, failures, warnings, and/or anomalies with various associated system or device attributes (e.g., CPU and/or memory usage, etc.). For example, a banking application has a web page as a user interface. When users of the banking application click on "Interest Rates" the users receive the requested information sometimes and occasionally they receive a "Requested information not found" message instead. When the application log file for the banking application is analyzed along with the messaging server logs, fault correlator module 426 identifies that whenever the messaging server is experiencing a high number of requests, the users of the banking application receive the "Requested information not found" message. In this case, the failure experienced by users in one layer of the system (i.e., the banking application) is actually caused by a fault in another layer of the system (i.e., the messaging server). Fault correlator module 426 identifies such correlations across architecture/technology layers of the system in enterprise environment 100.

Fault analysis and prediction system 110 includes a fault modeler module 428 and a fault model database 430. In an example embodiment, fault model database 430 stores one or more faults (i.e., errors, failures, warnings, and/or anomalies) identified by fault correlator module 426. Fault model database 430 also includes a snapshot of identifiers or tags associated with the data (e.g., data 108) when the identified fault happened. Fault modeler module 428 is configured to refer to fault model database 430 to generate fault predictions based on the current identifiers or tags and one or more historical patterns of identifiers or tags observed when faults occurred in enterprise environment 100 under similar circumstances.

Fault modeler module 428 may compare workflows and identifiers from multiple users in enterprise environment 100 to determine at least one fault identification or fault prediction. The fault prediction by fault modeler module 428 is based on recognizing a subset of interactions of time-based sequence of interactions by a user with the at least one or more systems or applications in enterprise environment 100 that have historically caused or generated a fault. Fault modeler module 428 may access the historical fault information included in fault model database 430 along with the workflows and identifiers or tags to determine that a fault may occur.

For example, fault modeler module 428 determines that, historically, whenever a time-based sequence of interactions occurs, Events A, B, C, D and E, a Fault F occurs in enterprise environment 100 within the next 30 minutes. Subsequently, when fault modeler module 428 recognizes a subset of interactions of the time-based sequence of interactions by a user with the at least one or more systems or applications in enterprise environment 100 occur (e.g., Events A, B, C, D and E occur), fault modeler module 428 will predict the occurrence of Fault F. That is, based on historical fault information in fault model database 430, fault modeler module 428 is configured to provide a fault prediction when similar circumstances are determined.

Fault modeler module 428 may identify a subset of interactions that are associated with a historically known fault even when the sequence of interactions includes additional interactions that are not associated with the fault. For example, if there are other events occurring in the middle of a known subset of interactions, i.e., Events A, B, G, K, C, L, D, M, and E occur, fault modeler module 428 still identifies that the subset of interactions, i.e., Events A, B, C, D and E have occurred, which is recognized by fault modeler module 428 to generate a fault prediction that Fault F will occur as a result.

In some embodiments, fault analysis and prediction system 110 may include an auto healer module 434. Auto healer module 434 may be configured to implement a corrective action automatically upon determination of a fault identification or fault prediction. For example, auto healer module 434 may look up a fault in a root cause and fix repository 436. Root cause and fix repository 436 is a database that correlates fault conditions to known corrective actions based on a fault identification or fault prediction. Auto healer module 434 may implement a corrective action for a fault stored in root cause and fix repository 436 by performing a sequence of steps correlated to the fault to prevent and/or fix the fault in enterprise environment 100.

In an example embodiment, various databases included in fault analysis and prediction system 110, including, but not limited to: tag corpus 406, tag model repository 410, workflow model repository 432, fault model database 430, root cause and fix repository 436, and theme and keyword repository 510, initially may be generated manually and maintained through automatic recommendation and human reviews (e.g., by administrator 440 or SME).

Visualizer 438 may be a display or other user interface that is configured to display results and recommendations provided by fault analysis and prediction system 110. For example one or more faults 118 (shown in FIG. 1) determined by fault analysis and prediction system 110 based on data 108 may be displayed or provided as an alert or message on visualizer 438. Admin 440 may access fault analysis and prediction system 110 using a comprehensive UI for all management-related tasks.

Figure 7:
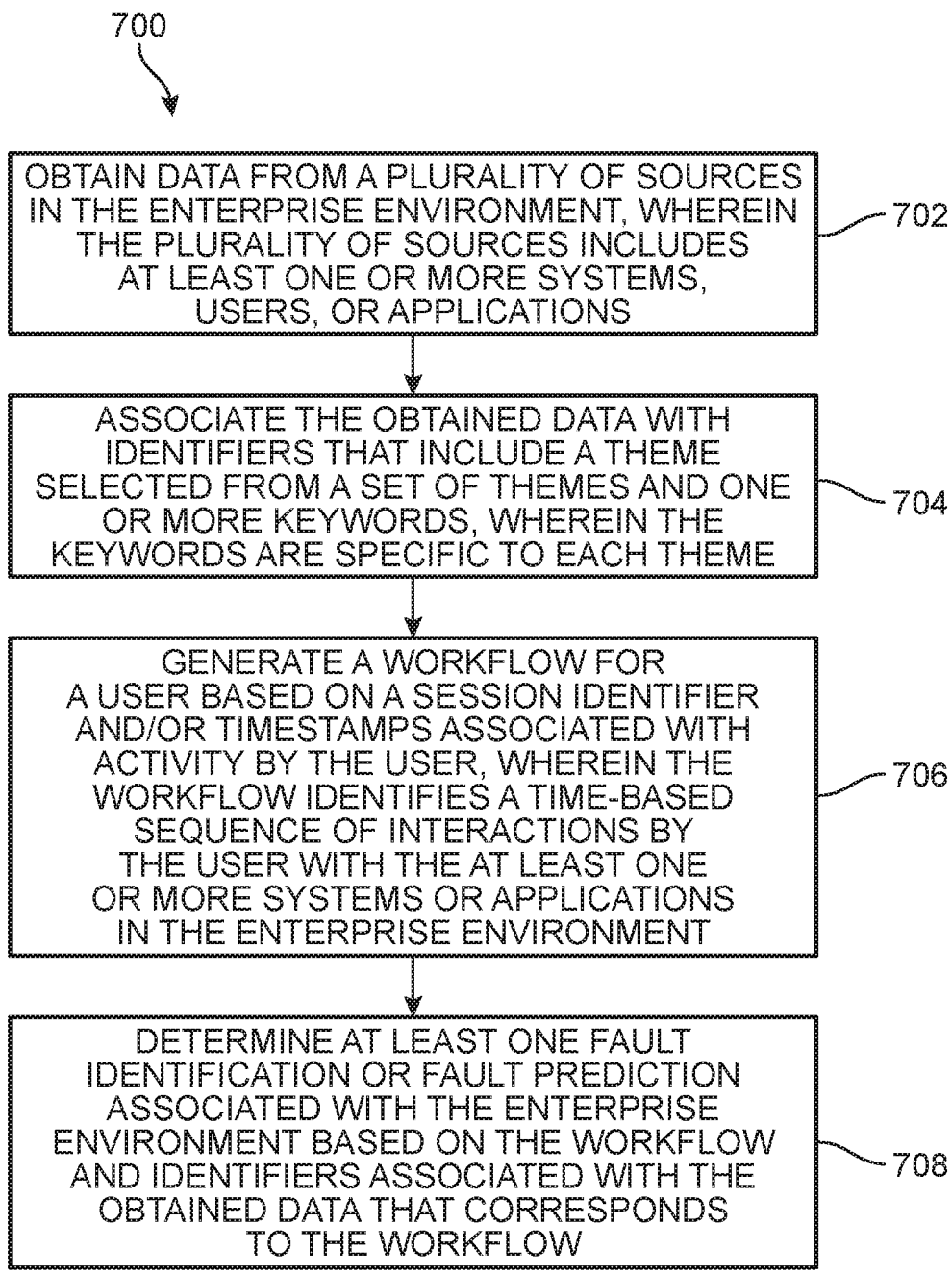
FIG. 7 is a flowchart of an example embodiment of a method for fault analysis and prediction in an enterprise environment.

FIG. 7 is a flowchart of an example embodiment of a method 700 for fault analysis and prediction in an enterprise environment. In an example embodiment, method 700 may be implemented by fault analysis and prediction system 110 to analyze and predict faults associated with enterprise environment 100.

In this embodiment, method 700 may begin at an operation 702 where data is obtained from a plurality of sources in the enterprise environment. The plurality of sources includes at least one or more systems, users, or applications. For example, as shown in FIG. 1, data 108 obtained from enterprise environment 100 may include information associated with a plurality of sources, including, but not limited to: plurality of users 102, plurality of systems 104, and/or plurality of applications 106.

Next, method 700 includes an operation 704. At operation 704, the obtained data from operation 702 is associated with identifiers. The identifiers include a theme selected from a set of themes and one or more keywords, where the keywords are specific to each theme. For example, as shown in FIG. 5, set of themes 502 includes first theme 504, second theme 506, and third theme 508, and first group of keywords 512 are specific to first theme 504, second group of keywords 514 are specific to second theme 506, and third group of keywords 516 are specific to third theme 508.

Method 700 also includes an operation 706, where a workflow is generated for a user based on a session identifier and/or timestamps associated with activity by the user. The workflow identifies a time-based sequence of interactions by the user with the at least one or more systems or applications in the enterprise environment. For example, as shown in FIG. 6, workflow 600 identifies a sequence of interactions by a user of plurality of users 102 with systems 104 and/or applications 106 in enterprise environment 100.

Next, at an operation 708, at least one fault identification or fault prediction associated with the enterprise environment is determined. The fault identification or fault prediction is based on the workflow generated at operation 706 and identifiers associated with the obtained data that corresponds to the workflow. For example, a fault may be determined as described above with reference to fault modeler module 428. In some embodiments, upon determination of the fault identification or fault prediction, a corrective action may be implemented. The corrective action may be implemented manually, for example, by administrator 440 or other entity, or may be implemented automatically, for example, by auto healer module 434, as described above. Method 700 may be repeated upon ingestion of new or updated data associated with the same enterprise environment (e.g., enterprise environment 100). Method 700 may also be repeated for data associated with a new or different enterprise environment.

The techniques for empirical fault analytics presented herein for fault analysis and prediction may be used in real time, a batch processing mode, or both, to identify one or more patterns associated with an enterprise environment. These patterns may include, but are not limited to: application usage patterns (e.g., end-to-end flows, software component usage, data combinations usage, etc.), application failures (e.g., individual failure patterns, relationships between failures, etc.), anomaly detection (e.g., rogue behavior of various application or system components, infrastructure elements, architecture attributes, etc.), failure prediction (e.g., prediction of failures, probable root causes), and/or auto healing (e.g., executing a sequence of tasks that can address root causes predicted by fault analysis and prediction system 110).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for fault analysis and prediction in an enterprise environment, the method comprising:
    obtaining data from a plurality of sources in the enterprise environment, wherein the plurality of sources includes at least one or more systems, users, or applications;
    associating the obtained data with identifiers that include a theme selected from a set of themes and one or more keywords, wherein the keywords are specific to each theme;
    generating a workflow for a user based on a session identifier and/or timestamps associated with activity by the user, wherein the workflow identifies a time-based sequence of interactions by the user with the at least one or more systems or applications in the enterprise environment; and
    determining at least one fault identification or fault prediction associated with the enterprise environment based on the workflow and identifiers associated with the obtained data that corresponds to the workflow.

2. The method of claim 1, wherein determining the at least one fault identification or fault prediction based on the workflow and identifiers further comprises:
    comparing workflows and identifiers from multiple users in the enterprise environment to determine the at least one fault identification or fault prediction.

3. The method of claim 1, wherein the fault prediction is based on a subset of interactions of the time-based sequence of interactions by the user with the at least one or more systems or applications in the enterprise environment.

4. The method of claim 3, wherein the subset of interactions correspond to a known fault condition for the enterprise environment stored in a fault database generated based on a previous time-based sequence of interactions by a different user.

5. The method of claim 1, further comprising:
    based on the at least one fault identification or fault prediction, implementing a corrective action using a database that correlates fault conditions to known corrective actions.

6. The method of claim 5, wherein the corrective action is implemented automatically upon determination of the at least one fault identification or fault prediction.

7. The method of claim 1, wherein obtaining data from the plurality of sources in the enterprise environment comprises using a plurality of agents to collect data; and
    wherein each of the plurality of agents collects data from a different source within the enterprise environment.

8. A system for fault analysis and prediction in an enterprise environment, the system comprising:
    at least one interface configured to communicate with systems and applications in the enterprise environment;
    a memory; and
    a processor in communication with the at least one interface and the memory, wherein the processor is configured to:
        obtain data from a plurality of sources in the enterprise environment, wherein the plurality of sources includes at least one or more systems, users, or applications;
        associate the obtained data with identifiers that include a theme selected from a set of themes and one or more keywords, wherein the keywords are specific to each theme;
        generate a workflow for a user based on a session identifier and/or timestamps associated with activity by the user, wherein the workflow identifies a time-based sequence of interactions by the user with the at least one or more systems or applications in the enterprise environment; and
        determine at least one fault identification or fault prediction associated with the enterprise environment based on the workflow and identifiers associated with the obtained data that corresponds to the workflow.

9. The system of claim 8, wherein determining the at least one fault identification or fault prediction based on the workflow and identifiers further comprises:
    comparing workflows and identifiers from multiple users in the enterprise environment to determine the at least one fault identification or fault prediction.

10. The system of claim 8, wherein the fault prediction is based on a subset of interactions of the time-based sequence of interactions by the user with the at least one or more systems or applications in the enterprise environment.

11. The system of claim 10, wherein the subset of interactions correspond to a known fault condition for the enterprise environment stored in a fault database generated based on a previous time-based sequence of interactions by a different user.

12. The system of claim 8, wherein the processor is further configured to:
   implement a corrective action using a database that correlates fault conditions to known corrective actions based on the at least one fault identification or fault prediction.

13. The system of claim 12, wherein the processor is configured to implement the corrective action automatically upon determination of the at least one fault identification or fault prediction.

14. The system of claim 8, wherein obtaining data from the plurality of sources in the enterprise environment comprises using a plurality of agents to collect data; and
   wherein each of the plurality of agents collects data from a different source within the enterprise environment.

15. One or more non-transitory computer readable storage media encoded with instructions that, when executed by a processor of a fault analysis and prediction system, causes the processor to:
   obtain data from a plurality of sources in an enterprise environment, wherein the plurality of sources includes at least one or more systems, users, or applications;
   associate the obtained data with identifiers that include a theme selected from a set of themes and one or more keywords, wherein the keywords are specific to each theme;
   generate a workflow for a user based on a session identifier and/or timestamps associated with activity by the user, wherein the workflow identifies a time-based sequence of interactions by the user with the at least one or more systems or applications in the enterprise environment; and
   determine at least one fault identification or fault prediction associated with the enterprise environment based on the workflow and identifiers associated with the obtained data that corresponds to the workflow.

16. The non-transitory computer readable storage media of claim 15, wherein determining the at least one fault identification or fault prediction based on the workflow and identifiers further comprises:
   comparing workflows and identifiers from multiple users in the enterprise environment to determine the at least one fault identification or fault prediction.

17. The non-transitory computer readable storage media of claim 15, wherein the fault prediction is based on a subset of interactions of the time-based sequence of interactions by the user with the at least one or more systems or applications in the enterprise environment.

18. The non-transitory computer readable storage media of claim 17, wherein the subset of interactions correspond to a known fault condition for the enterprise environment stored in a fault database generated based on a previous time-based sequence of interactions by a different user.

19. The non-transitory computer readable storage media of claim 15, wherein the instructions further cause the processor to:
   automatically implement a corrective action using a database that correlates fault conditions to known corrective actions based on the at least one fault identification or fault prediction upon determination of the at least one fault identification or fault prediction.

20. The non-transitory computer readable storage media of claim 15, wherein obtaining data from the plurality of sources in the enterprise environment comprises using a plurality of agents to collect data; and
   wherein each of the plurality of agents collects data from a different source within the enterprise environment.

* * * * *